United States Patent
Aoyagi et al.

(10) Patent No.: US 12,177,782 B2
(45) Date of Patent: Dec. 24, 2024

(54) NETWORK NODE AND COMMUNICATION METHOD FOR PAGING A TERMINAL

(71) Applicant: NTT DOCOMO, INC., Tokyo (JP)

(72) Inventors: Kenichiro Aoyagi, Tokyo (JP); Yuuya Miyazaki, Tokyo (JP); Motohiro Abe, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 257 days.

(21) Appl. No.: 17/637,425

(22) PCT Filed: Aug. 30, 2019

(86) PCT No.: PCT/JP2019/034244
§ 371 (c)(1),
(2) Date: Feb. 22, 2022

(87) PCT Pub. No.: WO2021/038861
PCT Pub. Date: Mar. 4, 2021

(65) Prior Publication Data
US 2022/0279446 A1 Sep. 1, 2022

(51) Int. Cl.
*H04W 52/02* (2009.01)
*H04W 68/00* (2009.01)

(52) U.S. Cl.
CPC ..... *H04W 52/0232* (2013.01); *H04W 68/005* (2013.01)

(58) Field of Classification Search
CPC ............. H04W 24/02; H04W 52/0232; H04W 52/0229; H04W 52/028; H04W 52/0216; H04W 68/02; H04W 72/23; H04W 68/005; H04W 72/0446; H04W 74/006; H04W 76/28; H04W 88/14; Y02D 30/70
See application file for complete search history.

(56) References Cited

U.S. PATENT DOCUMENTS

2022/0116908 A1* 4/2022 Chun .................... H04W 76/27

FOREIGN PATENT DOCUMENTS

JP 2018-061191 A 4/2018

OTHER PUBLICATIONS

International Search Report issued in PCT/JP2019/034244 on Mar. 31, 2020 (5 pages).
Written Opinion of the International Searching Authority issued in PCT/JP2019/034244 on Mar. 31, 2020 (4 pages).
Ericsson; "9.13.9 Wake Up Signal"; 3GPP TSG-RAN2 Meeting #101bis, R2-1804962; Sanya, China; Apr. 16-20, 2018 (10 pages).
3GPP TS 36.300 V15.6.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)"; Jun. 2019 (365 pages).

(Continued)

*Primary Examiner* — Quoc Thai N Vu
(74) *Attorney, Agent, or Firm* — Osha Bergman Watanabe & Burton LLP

(57) ABSTRACT

An exchange includes: a reception unit that receives, from a gateway, a message indicating presence of an incoming call to a terminal; a control unit that adjusts the time for transmitting paging corresponding to the message to a base station; and a transmission unit that transmits the paging to the base station at the adjusted time.

5 Claims, 7 Drawing Sheets

(56) References Cited

OTHER PUBLICATIONS

3GPP TS 23.401 V15.8.0; "3rd Generation Partnership Project; Technical Specification Group Services and System Aspects; General Packet Radio Service (GPRS) enhancements for Evolved Universal Terrestrial Radio Access Network (E-UTRAN) access (Release 15)"; Jun. 2019 (411 pages).
Office Action issued in counterpart Japanese Patent Application No. 2021-541945 mailed on Sep. 5, 2023 (8 pages).
Office Action issued in Chinese Patent Application No. 201980099693.5, mailed May 20, 2024 (16 pages).
3GPP TSG-RAN2 Meeting #101; 'Wake Up Signal in NB-IoT and MTC; Ericsson; R2-1802586; Athens, Greece; Feb. 26, 2018-Mar. 2, 2018 (11 pages).

* cited by examiner

NETWORK NODE AND COMMUNICATION METHOD FOR PAGING A TERMINAL

TECHNICAL FIELD

The present invention relates to an exchange and a communication method in wireless communication systems.

BACKGROUND ART

In the LTE (Long Term Evolution), extended discontinuous reception, that is, eDRX, is employed (e.g., Non-Patent Document 1 and Non-Patent Document 2). In the eDRX, wake-up signal (WUS) has been introduced in order to save power by reducing a paging reception process when user equipment (UE) performs discontinuous reception. It is possible to determine whether the UE activates the paging reception process by sending WUS to the UE from an eNB (E-UTRAN (Universal Terrestrial Radio Access Network) NodeB) prior to the paging reception. If it is determined by the WUS that the paging reception process is not necessary, the UE can skip the paging reception process, thus reducing power consumption.

PRIOR ART DOCUMENTS

Non-Patent Documents

[Non-Patent Document 1] 3GPP TS 36.300 V15.6.0 (2019-06)
[Non-Patent Document 2] 3GPP TS 23.401 V15.8.0 (2019-06)

SUMMARY OF INVENTION

Problem to be Solved by the Invention

If the UE is in an eDRX state, and paging is sent from a network later than the WUS used to determine whether to start the paging reception process, the NE may fail to receive paging because the paging reception process is not started.

The present invention has been made in view of the foregoing, and is intended to improve the likelihood that paging will be received during discontinuous reception in a wireless communication system.

Means for Solving the Problem

According to the disclosed technique, there is provision of an exchange including a reception unit that receives, from a gateway, a message indicating presence of an incoming call to a terminal, a control unit that adjusts time for transmitting paging corresponding to the message to a base station, and a transmission unit that transmits the paging to the base station at the adjusted time.

Effect of the Invention

The disclosed technique can improve likelihood that paging can be received during discontinuous reception in a wireless communication system.

DETAILED DESCRIPTION OF THE PREFERRED EMBODIMENTS

Hereinafter, embodiments of the present invention will be described with reference to the drawings. The embodiments described below are examples, and embodiments to which the present invention is applied are not limited to the following embodiments.

In the operation of a wireless communication system according to an embodiment of the present invention, existing techniques are used as appropriate. However, an example of the existing techniques includes existing LTE, but is not limited to the existing LTE. The term "LTE" used in the present specification has a broad meaning, including LTE-Advanced and communication standards after LTE-Advanced (e.g., NR), unless otherwise stated.

In the embodiments of the present invention, as a duplex communication system, a TDD (Time Division Duplex) system, an FDD (Frequency Division Duplex) system, an FDD (Frequency Division Duplex) system, or other communication systems (such as Flexible Duplex) may be adopted.

Further, in the embodiments of the present invention, an expression of "a wireless parameter or the like is configured" may mean that a predetermined value is set in advance (pre-configured), or may mean that a wireless parameter indicated by a base station 10 or a terminal 20 is set.

Figure 1:
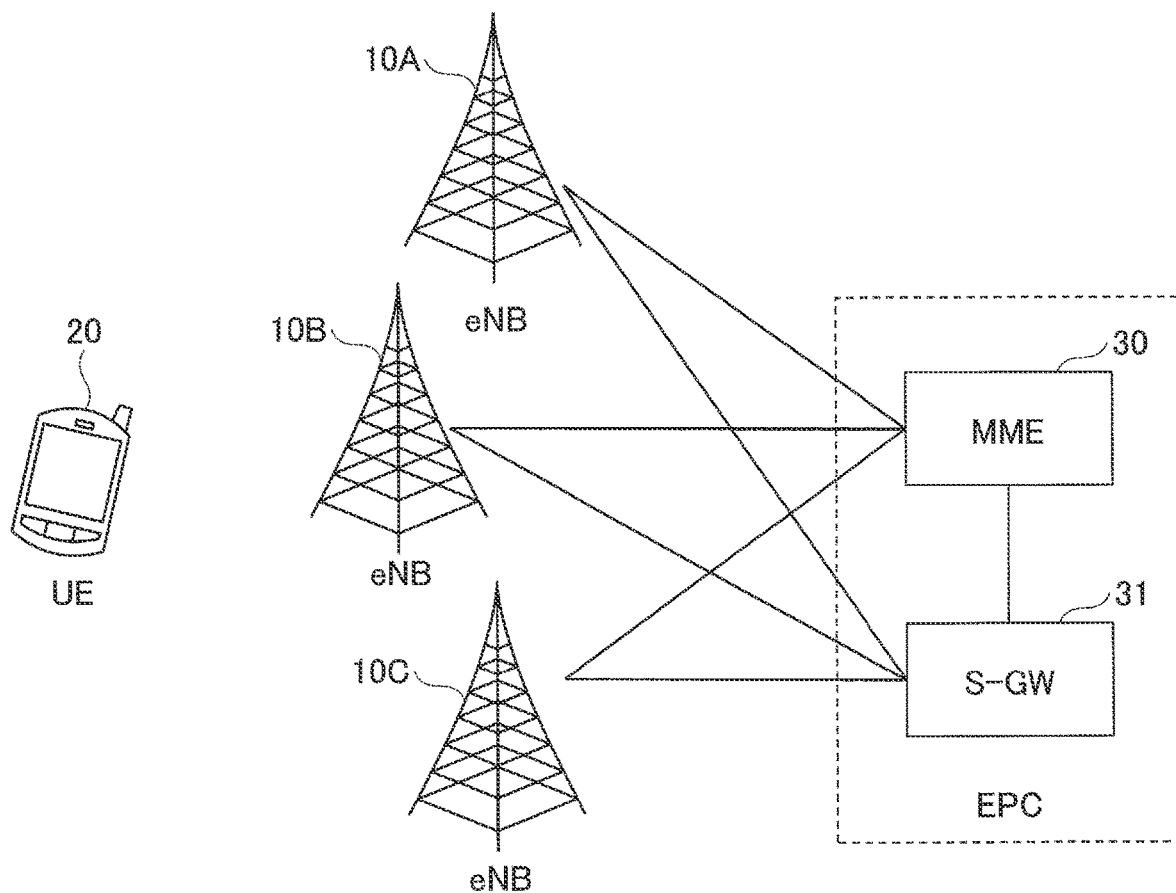
FIG. 1 is a diagram illustrating an example of a configuration of a wireless communication system.

FIG. 1 is a diagram illustrating a configuration example of the wireless communication system. The wireless communication system in the embodiment of the present invention includes a base station 10A which is an eNB, a base station 10B, a base station 10C, a terminal 20 which is UE, an exchange 30 which is an MME, and a serving gateway 31 which is an S-GW, as illustrated in FIG. 1. In FIG. 1, the number of the base stations 10 is 3, the number of the terminals 20 is 1, the number of the exchanges 30 is 1, and the number of the serving gateways 31 is 1. However, this is an example, and more devices may be present in the wireless communication system. For example, in the NR (New Radio) system rather than the LTE, the base station 10, the exchange 30 and the serving gateway 31 may correspond to other names of devices or functions. For example, the base station 10 may correspond to gNB, the exchange 30 may correspond to an AMF (Access and Mobility Management Function) or the like, and the serving gateway 31 may correspond to an SMF (Session Management Function) or a UPF (User Plane Function).

The base station 10 is a communication device that provides one or more cells and that performs wireless communication with the terminal 20. Physical resources of a radio signal are defined in a time domain and a frequency domain. The time domain may be defined by the number of OFDM symbols, and the frequency domain may be defined by the number of subcarriers or resource blocks. The base station 10 transmits a synchronization signal and system information to the terminal 20. Examples of the synchronization signal include a PSS (Primary Synchronization Signal) and an SSS (Secondary Synchronization Signal). Part of the system information is transmitted by a PBCH for example, which is also referred to as broadcast information. The synchronization signal and the broadcast information may be transmitted periodically. For example, the base station 10 transmits a control signal or data to the terminal 20 via a downlink (DL), and receives a control signal or data from the terminal 20 via an uplink (UL). The base station 10 is also connected to each of the exchange 30 and the serving gateway 31.

Examples of the terminal 20 include a smartphone, a cellular phone, a tablet, a wearable terminal, and a communication device equipped with a wireless communication function such as a communication module for M2M (Machine-to-Machine). The terminal 20 utilizes various communication services provided by the wireless communication system by receiving a control signal or data from the base station 10 via the DL and by transmitting a control signal or data to the base station 10 via the UL.

The exchange 30 accommodates the base station 10, and provides a mobility control function, a bearer control function, and the like. In addition, for example, the exchange 30 has a function of controlling DRX or eDRX, and a function of delivering paging when there is an incoming call. Paging may be delivered to the multiple base stations 10 based on a tracking area and the like.

The serving gateway 31 is a packet switch on the LTE network. The serving gateway 31 has a function of transmitting and receiving user data.

The exchange 30 and the serving gateway 31 are included in an evolved packet core (EPC) of a core network. The EPC is a network that accommodates an LTE access network, and is configured by an exchange, a subscriber information management device, and the like. The terminal 20 communicates with the core network via a wireless access network.

Figure 2:
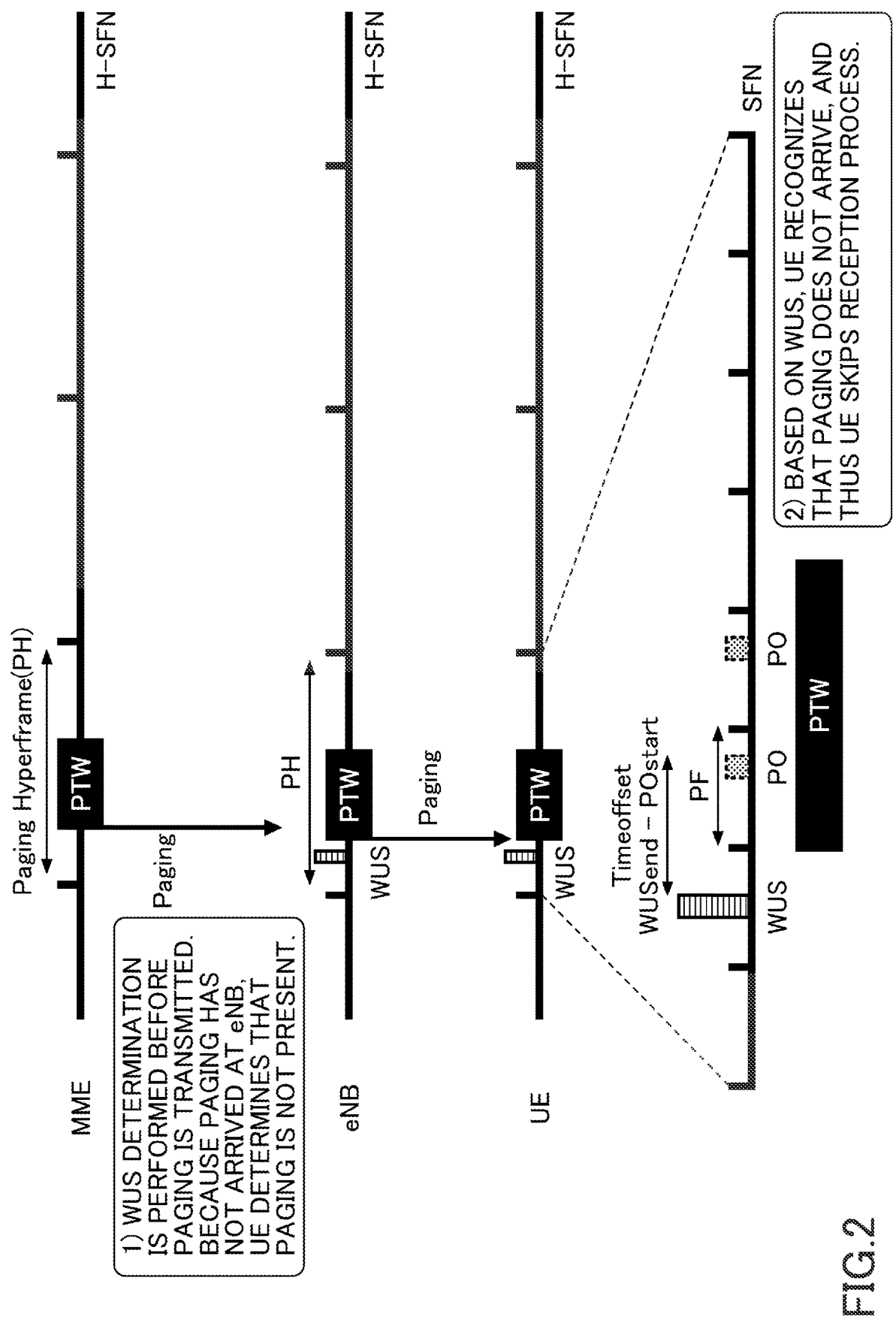
FIG. 2 is a diagram for explaining an example of eDRX.

FIG. 2 is a diagram illustrating an example of extended discontinuous reception (eDRX). The WUS (Wake Up Signal) defined by 3GPP (3rd Generation Partnership Project) is a technique for implementing energy saving, by reducing a paging reception process when the terminal 20 performs discontinuous reception such as the eDRX. A signaling is performed between the base station 10 and the terminal 20 before the time of receiving paging, and the terminal 20 determines whether the paging reception process is to be activated or not. By skipping an unnecessary paging reception process, the terminal 20 can reduce electric power required for activating a radio function.

A period of the eDRX may be defined as an integer multiple of H-SFN (Hyper System Frame Number) illustrated in FIG. 2. The exchange 30 may determine the eDRX period for each of the terminals 20, and may indicate it to the base station 10. For example, SFN (System Frame Number) may be 10 ms, and the H-SFN may be 10.24 s, which is composed of 1024 SFN's. The H-SFN during which the terminal 20 attempts reception is referred to as PH (Paging Hyperframe) illustrated in FIG. 2.

In the eDRX, H-SFN-level time synchronization is performed among the exchange 30, the base station 10, and the terminal 20. The H-SFN-level time synchronization refers to synchronization with a margin of several seconds, for example. An incoming call process is performed by the exchange 30 transmitting paging at appropriate timing. A period within the PH when the terminal 20 attempts to receive paging is referred to as a PTW (Paging Time Window). The exchange 30 transmits paging to the base station 10 based on the PTW.

Between the base station 10 and the terminal 20, SFN level time synchronization is performed. A period when paging can be processed between the base station 10 and the terminal 20 is referred to as a PO (Paging Occasion), and the terminal 20 receives paging at the timing of the PO within the PTW. Here, by checking presence or absence of paging between the base station 10 and the terminal 20 prior to the PTW, the base station 10 can send, to the terminal 20 by using the WUS, information indicating whether or not the PO included in the PTW is to be skipped. As illustrated in FIG. 2, the period from the end of the WUS to the start of the PO is referred to as a time offset, and an SFN including a PO is called a PF (paging frame).

As illustrated in 1) of FIG. 2, if determination pertaining to the WUS is performed before paging is transmitted from the exchange 30, by the WUS, information indicating that the PO included in the PTW can be skipped is indicated to the terminal, because paging has not arrived at the base station 10. Therefore, as illustrated in 2) of FIG. 2, because the terminal 20 recognizes, by the WUS, that paging does not arrive, a reception process for the PO included in the PTW is skipped.

As described above, in a case in which determination of presence or absence of paging according to the WUS is activated earlier than the paging transmission performed by the exchange 30, the terminal 20 does not perform the reception process, and thus cannot receive paging.

In eDRX, precise time synchronization between related devices is not required, and accuracy of time synchronization depends on implementation or operation, in the eDRX operation, even if accuracy of time synchronization is degraded, the terminal 20 could receive paging at a subsequent PO if the exchange 30 transmitted the paging. However, if the WUS is introduced, because of a function of skipping a subsequent PO, a case may occur in which paging is not received. Further, information of WUS is managed between the base station 10 and the terminal 20, and is not indicated to the exchange 30. Therefore, it is difficult for the exchange 30 to perform control by taking account of presence of the WUS.

Therefore, the exchange 30 determines whether the eDRX is applied to the terminal 20, and if paging is held on a core network, the exchange 30 adjusts time of paging transmission, to control to transmit the paging earlier than regular transmission time. By advancing timing of transmitting paging on the core network side regardless of magnitude of the offset between the WUS and the PO, the order of timing of the paging and timing of the WUS can be secured, and failure of receiving the paging by the terminal 20 can be prevented.

For example, the exchange 30 determines whether or not the eDRX is applied and whether or not the paging hold is applied. For example, based on the result of the above-described determination, the exchange 30 determines whether it is necessary to adjust paging time. Further, for example, if it is necessary to adjust the paging time, the exchange 30 selects the appropriate number of seconds.

Figure 3:
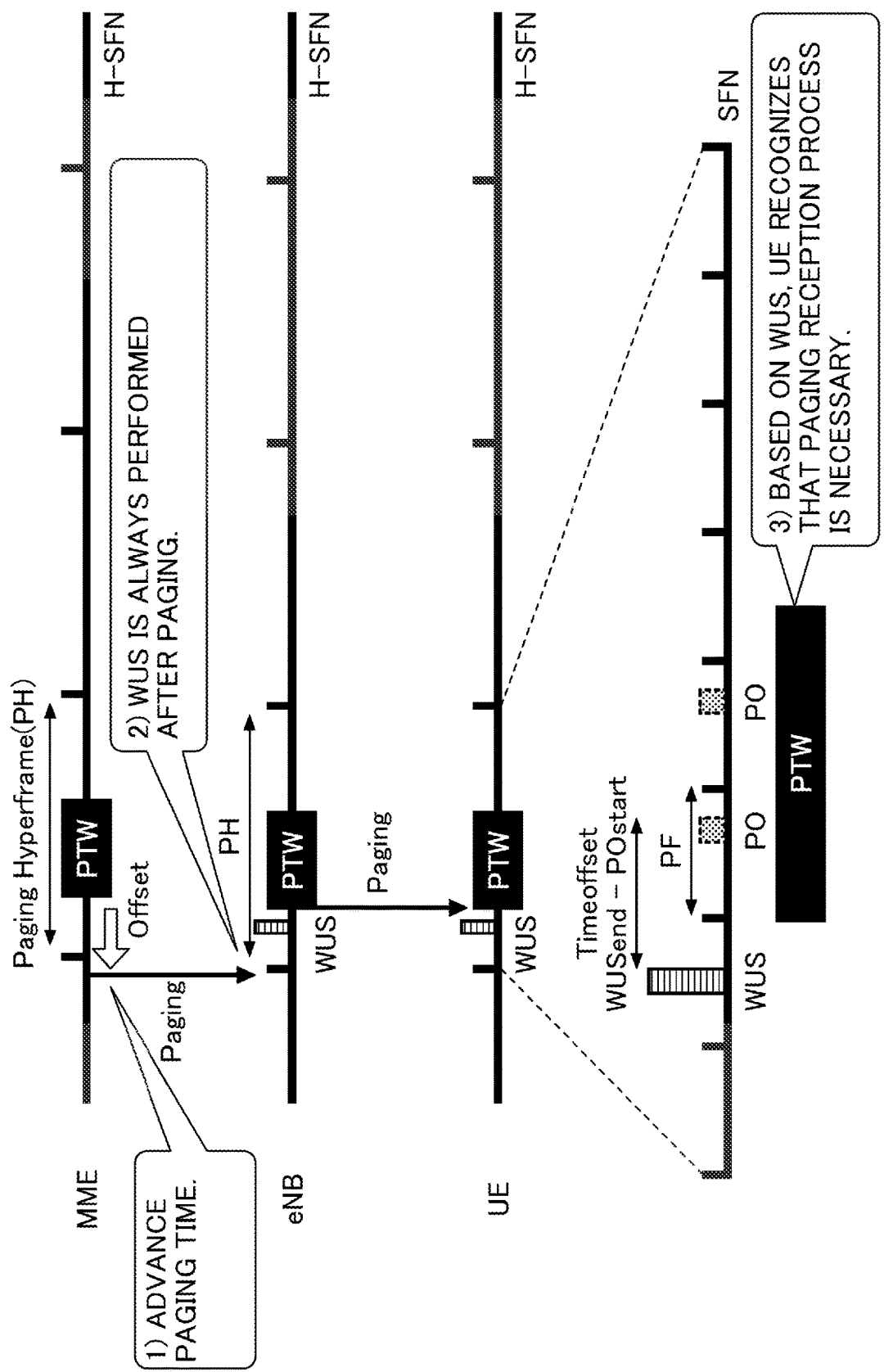
FIG. 3 is a diagram for explaining an example of eDRX according to an embodiment of the present invention.

FIG. 3 is a diagram illustrating an example of eDRX in the embodiment of the present invention. The exchange 30 determines whether or not eDRX is applied to a terminal 20 and whether or not paging to the terminal 20 is required to be held, and the exchange 30 advances paging time if necessary. By the function of adjusting the paging time, the paging time can be advanced, and the exchange 30 can transmit paging to the base station 10 prior to the determination pertaining to WUS.

As illustrated in 1) of FIG. 3, the exchange 30 advances the paging time by an offset amount. As illustrated in 2) of FIG. 3, determination pertaining to WUS is always performed after paging. Because the determination pertaining to WUS is performed by the base station 10 after the paging is transmitted from the exchange 30, information indicating that retrieval of a PO included in the PTW is required is sent to the terminal by the WUS. Therefore, as illustrated in 3) of FIG. 3, because the terminal 20 recognizes, by the WUS, that a paging reception process is necessary, the reception process for the PO included in the PTW is performed.

Figure 4:
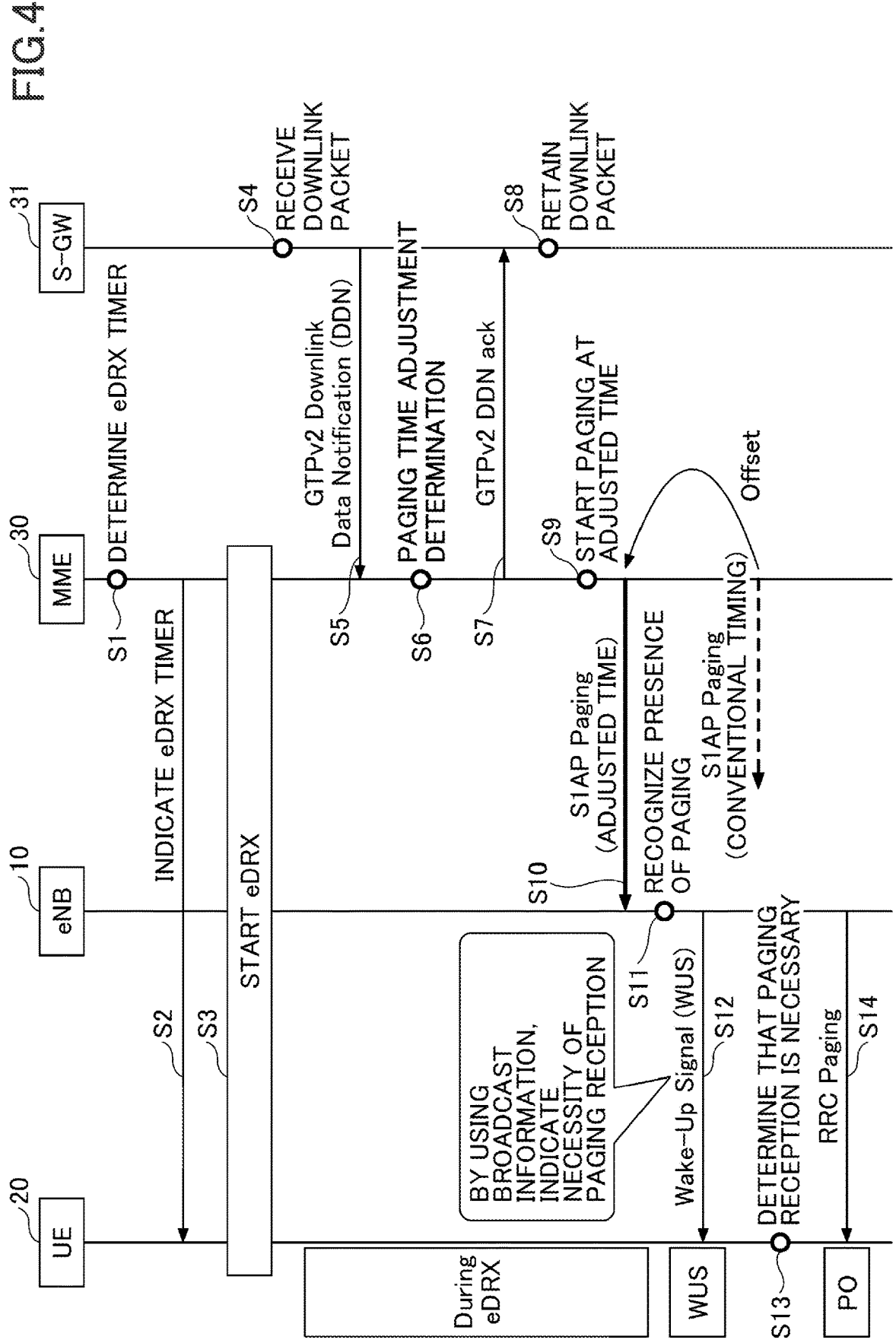
FIG. 4 is a sequence diagram for explaining an operation of the wireless communication system according to the embodiment of the present invention.

FIG. 4 is a sequence diagram for explaining an operation of the wireless communication system according to the embodiment of the present invention. The sequence diagram illustrated in FIG. 4 is used to illustrate an example of the paging reception process during eDRX illustrated in FIG. 3.

In step S1, the exchange 30 determines an eDRX timer. Subsequently, the exchange 30 indicates, to the terminal 20, the eDRX timer (S2). In step S3, eDRX is initiated at the terminal 20, the base station 10, and the exchange 30.

In step S4, the serving gateway 31 receives a Downlink packet addressed to the terminal 20. In step S5, the serving gateway 31 transmits "Downlink Data Notification" to the base station 10. Here, GTP (GPRS Tunnelling Protocol) v2 is an access control protocol, and the "Downlink Data Notification" is a message indicating, to the exchange 30, that there is an incoming call to the terminal 20. Subsequently, in step S6, the exchange 30 performs determination as to paging time adjustment.

Figure 5:
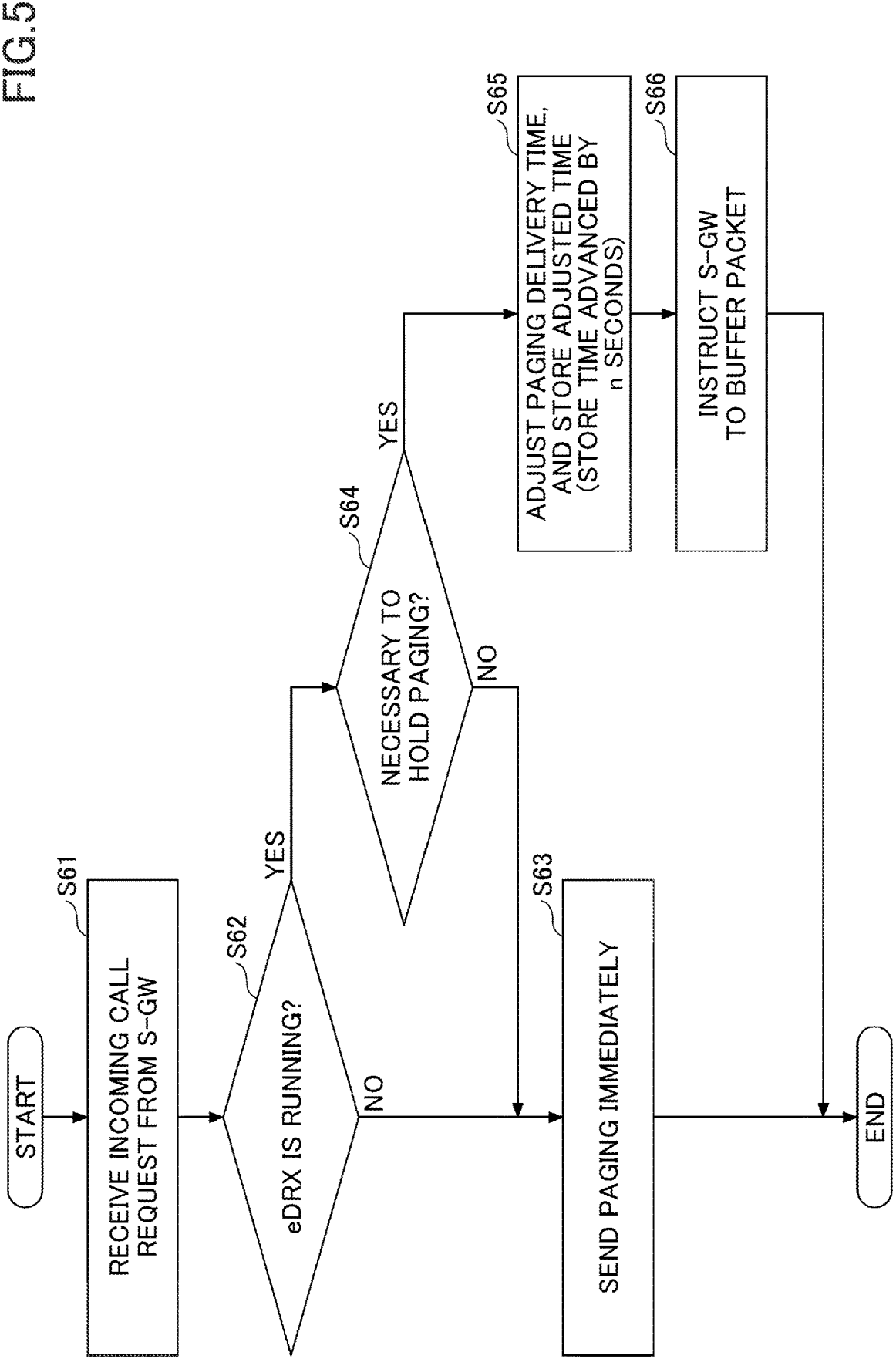
FIG. 5 is a flowchart illustrating an operation of an exchange 30 according to the embodiment of the present invention.

FIG. 5 is a flowchart illustrating an operation of the exchange 30 in the embodiment of the present invention. Using FIG. 5, the process performed by the exchange 30 in step S6 illustrated in FIG. 4 will be described in detail.

In step S61, the exchange 30 receives an incoming call request from the serving gateway 31. Subsequently, the exchange 30 determines whether or not eDRX is running in the terminal 20 corresponding to the incoming call request. If eDRX is not running (NO in S62), the process proceeds to step S63, and if eDRX is running (YES in S62), the process proceeds to step S64. In step S63, the exchange 30 immediately sends paging to the base station 10, and terminates the process flow.

Meanwhile, in step S64, the exchange 30 determines whether or not it is necessary to hold paging to the terminal 20 corresponding to the incoming call request. If it is not necessary to hold paging (NO in S64), the process proceeds to step S63, and if it is necessary to hold paging (Y33 in S64), the process proceeds to step S65. For example, in a case in which the terminal 20 is activating the eDRX but is in the Wakeup state, it is determined that paging is not required to be held.

In step S65, the exchange 30 adjusts paging delivery time and stores the adjusted time. For example, the exchange 30 may store time advanced by n seconds. For example, n seconds may be the time that corresponds to a period from the end of a WUS to the start of a PO, where n is not limited to an integer. Also, in the eDRX, for example, because the H-SFN-level time synchronization is performed among the exchange 30, the base station 10, and the terminal 20, the exchange 30 may set n such that the paging is transmitted from the exchange 30 to the base station 10 before the determination regarding the WUS, based: on the time when the base station 10 is supposed to perform the determination regarding the WUS in the PH; and the time that is added in accordance with accuracy of synchronization. Subsequently, the exchange 30 instructs the serving gateway 31 to buffer a packet (S66), and the process flow terminates.

Referring back to FIG. 4, the exchange 30 transmits "DDN ack" to the serving gateway 31 in step S7. Along with the "DDN ack", information indicating buffering of a packet illustrated in FIG. 3 may be transmitted to the serving gateway 31. Subsequently, the serving gateway 31 retains a Downlink packet addressed to the terminal 20 (S8).

In step S9, the exchange 30 starts paging at the adjusted time determined in step S6. The exchange 30 transmits the paging to the base station 10 (S10). Note that the S1AP is a protocol that defines a function between the exchange 30 and the base station 10 necessary for communication control of the terminal 20. Here, as illustrated in FIG. 4, the paging is transmitted to the base station 10 earlier by the amount of the advancing offset than the conventional paging transmission.

Subsequently, the base station 10 recognizes that there is paging to the terminal 20 (S11). Subsequently, the base station 10 transmits, to the terminal 20, a WUS indicating that paging reception is required, by using broadcast information (S12). In step 13, based on the received WUS, the terminal 20 determines that it is necessary to receive paging. Subsequently, the terminal 20 receives paging by RRC (Radio Resource Control) signaling from the base station 10 at the PO.

In the above-described operation in which the terminal 20 skips the paging process by using a WUS, the terminal 20 may have a status indicating whether a function of reducing the paging reception process when performing discontinuous reception, is being applied. The base station 10 and the exchange 30 may also set the status to the terminal 20, or may acquire the status from the terminal 20. By reducing the paging reception process, power saving of the terminal 20 is achieved.

In order to prevent paging from being transmitted from the exchange 30 to the base station 10 after the WUS, the base station 10 may transmit information indicating whether the WUS is transmitted or not to the exchange 30, or may transmit information indicating transmission time of the WUS to the exchange 30. The exchange 30 may adjust the time for transmitting paging, based on information indicating the transmission time of the WUS received from the base station 10.

According to the above-described embodiment, when an incoming call to the terminal 20 arrives, the exchange 30 determines whether or not the eDRX is applied to the terminal 20 and whether or not paging is required to be held, and advances the paging time necessary, so that the paging can be transmitted to the base station 10 earlier than the determination process related to the WUS that is performed in the base station 10.

That is, in the wireless communication system, the probability of receiving paging during discontinuous reception can be improved.

(Device Configuration)

Next, an example of functional configurations of the base station 10, the terminal 20, and the exchange 30 that perform the above-described processes and operations will be described. The base station 10, the terminal 20, and the exchange 30 include functions to implement the above-described embodiments. However, the base station 10, the terminal 20, and the exchange 30 may each have only part of the functions in the embodiments.

<Base Station 10>

Figure 6:
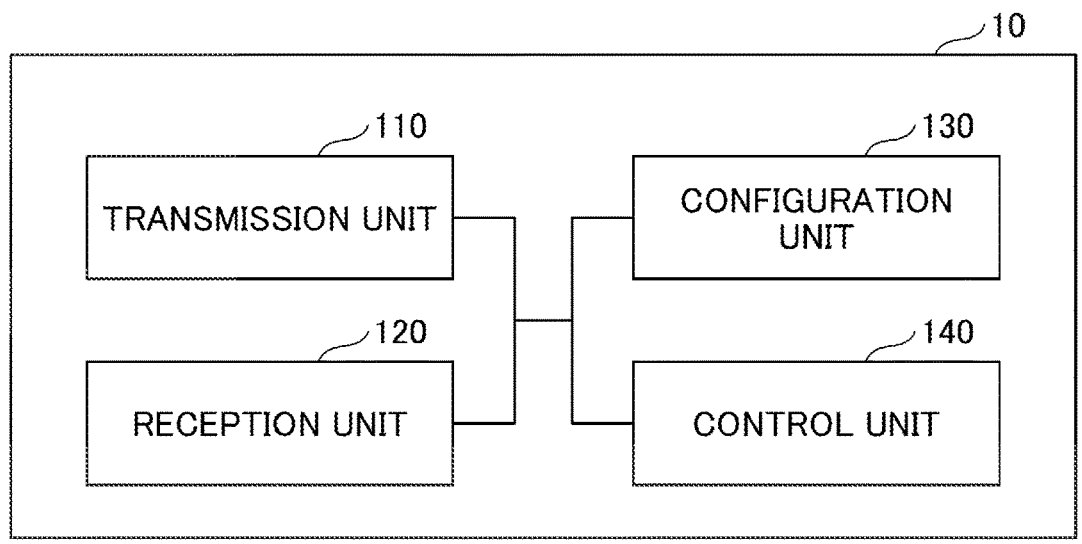
FIG. 6 is a diagram illustrating an example of a functional configuration of a base station 10 according to the embodiment of the present invention.

FIG. 6 is a diagram illustrating an example of the functional configuration of the base station 10 according to the embodiment of the present invention. As illustrated in FIG. 6, the base station 10 includes a transmission unit 110, a reception unit 120, a setting unit 130, and a control unit 140. The functional configuration illustrated in FIG. 6 is only one example. If the operation according to the embodiments of the present invention can be performed, boundaries of functions and names of functional units of any type may be employed.

The transmission unit 110 includes functions for generating a signal to be transmitted to the terminal 20 side and for transmitting the signal wirelessly. Also, the transmission unit 110 transmits an inter-network-node message to the other network nodes. The reception unit 120 includes functions for receiving various signals transmitted from the terminal 20, and for acquiring, for example, information of a higher layer from the received signals. The transmission unit 110 also has a function to transmit a PSS, an SSS, a PBCH, a DL/UL control signal, or the like to the terminal 20. The reception unit 120 receives an inter-network-node message from other network nodes.

The setting unit 130 stores setting information that is set in advance, and various setting information to be transmitted to the terminal 20. Contents of the setting information are, for example, setting information pertaining to discontinuous reception and paging.

The control unit 140 performs control of discontinuous reception and paging, as described in the embodiment. A function unit related to signal transmission in the control unit 140 may be included in the transmission unit 110, and a function unit related to signal reception in the control unit 140 may be included in the reception unit 120.

<Terminal 20>

Figure 7:
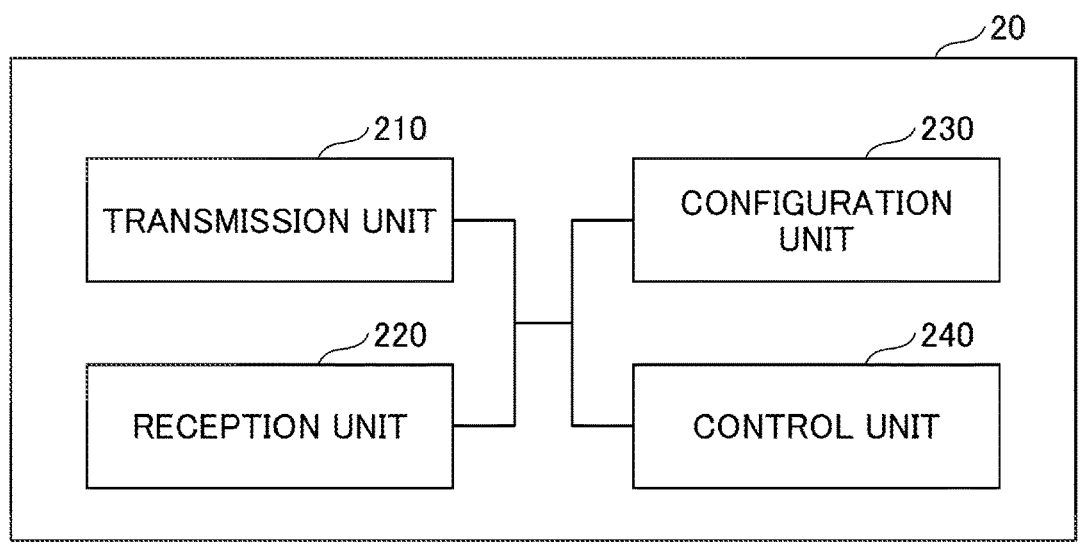
FIG. 7 is a diagram illustrating an example of a functional configuration of a terminal 20 according to the embodiment of the present invention.

FIG. 7 is a diagram illustrating an example of the functional configuration of the terminal 20 according to the embodiment of the present invention. As illustrated in FIG. 7, the terminal 20 includes a transmission unit 210, a reception unit 220, a setting unit 230, and a control unit 240. The functional configuration illustrated in FIG. 7 is only one example. If the operation according to the embodiments of the present invention can be performed, boundaries of functions and names of functional units of any type may be employed.

The transmission unit 210 creates a transmission signal from transmission data, and transmits the transmission signal wirelessly. The reception unit 220 receives various signals wirelessly, and acquires signals of a higher layer from the received signal of a physical layer. The reception unit 220 has a function of receiving the PSS, the SSS, the PBCH, and the DL/UL/SL control signal transmitted from the base station 10. For example, the transmission unit 210 transmits, as D2D communication, a PSCCH (Physical Sidelink Control Channel), a PSSCH (Physical Sidelink Shared Channel), a PSDCH (Physical Sidelink Discovery Channel), a PSBCH (Physical Sidelink Broadcast Channel), and the like to other terminals 20, and the reception unit 220 receives the PSCCH, the PSSCH, the PSDCH, the PSBCH, and the like from the other terminals 20.

The setting unit 230 stores various setting information that is received from the base station 10 by the reception unit 220. The setting unit 230 also stores setting information that is set in advance. The contents of the setting information are, for example, setting information pertaining to discontinuous reception and paging.

The control unit 240 performs control on discontinuous reception and paging as described in the embodiment. A function unit related to signal transmission in the control unit 240 may be included in the transmission unit 210, and a function unit related to signal reception in the control unit 240 may be included in the reception unit 220.

<Exchange 30>

Figure 8:
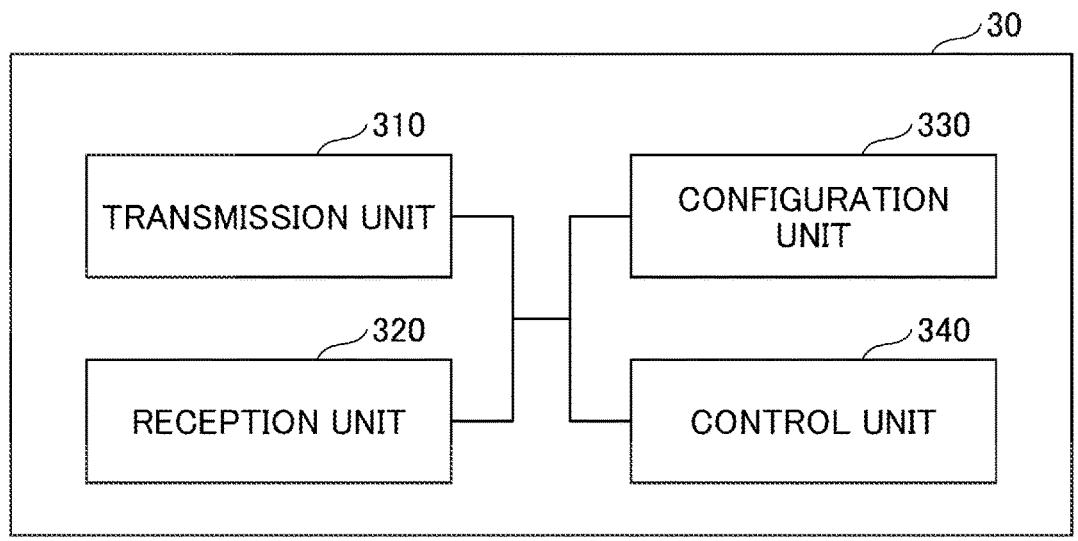
FIG. 8 is a diagram illustrating an example of a functional configuration of the exchange 30 according to the embodiment of the present invention.

FIG. 8 is a diagram illustrating an example of the functional configuration of the exchange 30 according to the embodiment of the present invention. As illustrated in FIG. 8, the exchange 30 includes a transmission unit 310, a reception unit 320, a setting unit 330, and a control unit 340. The functional configuration illustrated in FIG. 8 is only one example. If the operation according to the embodiments of the present invention can be performed, boundaries of functions and names of functional units of any type may be employed. A network node such as the serving gateway 31 may have function units illustrated in FIG. 8, and may realize the functions described in the embodiment.

The transmission unit 310 includes functions for generating a signal to be transmitted to the terminal 20 side, and for transmitting the signal. The transmission unit 310 transmits an inter-network-node message to other network nodes. The reception unit 320 receives various signals transmitted from the terminal 20. The reception unit 320 receives an inter-network-node message from other network nodes.

The setting unit 330 stores setting information that is set in advance, and various setting information to be transmitted to the terminal 20 or other network nodes. Contents of the setting information include, for example, setting information pertaining to communication between network nodes and setting information pertaining to discontinuous reception of the terminal 20.

The control unit 340 controls the communication between network nodes, as described in the embodiment. The control unit 340 sends control information pertaining to discontinuous reception, to the base station 10, the terminal 20, or other network nodes. The control unit 340 also sends control information pertaining to paging, to the base station 10, the terminal 20, or other network nodes. A function unit related to signal transmission in the control unit 340 may be included in the transmission unit 310, and a function unit related to signal reception in the control unit 340 may be included in the reception unit 320.

(Hardware Configuration)

The block diagrams (FIGS. 6, 7, and 8) used in the description of the above-described embodiment illustrate blocks of functional units. These functional blocks (components) are implemented by any combination of hardware and/or software. Further, the method of implementing each functional block is not particularly limited. That is, each functional block may be implemented by one device that is physically or logically coupled, or may be implemented by multiple physically or logically separated devices that are connected directly or indirectly (with a wire connection or a wireless connection, for example) with each other. Functional blocks may be implemented in combination with software in one or more of the above-described devices.

Functions include, but are not limited to, judgment, decision, determination, calculation, computation, processing, derivation, investigation, discovery, confirmation, reception, transmission, output, access, resolution, selection, choosing, establishment, comparison, assumption, expectation, presumption, broadcasting, notification, communication, forwarding, configuration, reconfiguration, allocation, mapping, and assignment. For example, a functional block (component) that functions to transmit is called a transmission unit or a transmitter. None of these are particularly limited in their implementation as described above.

Figure 9:
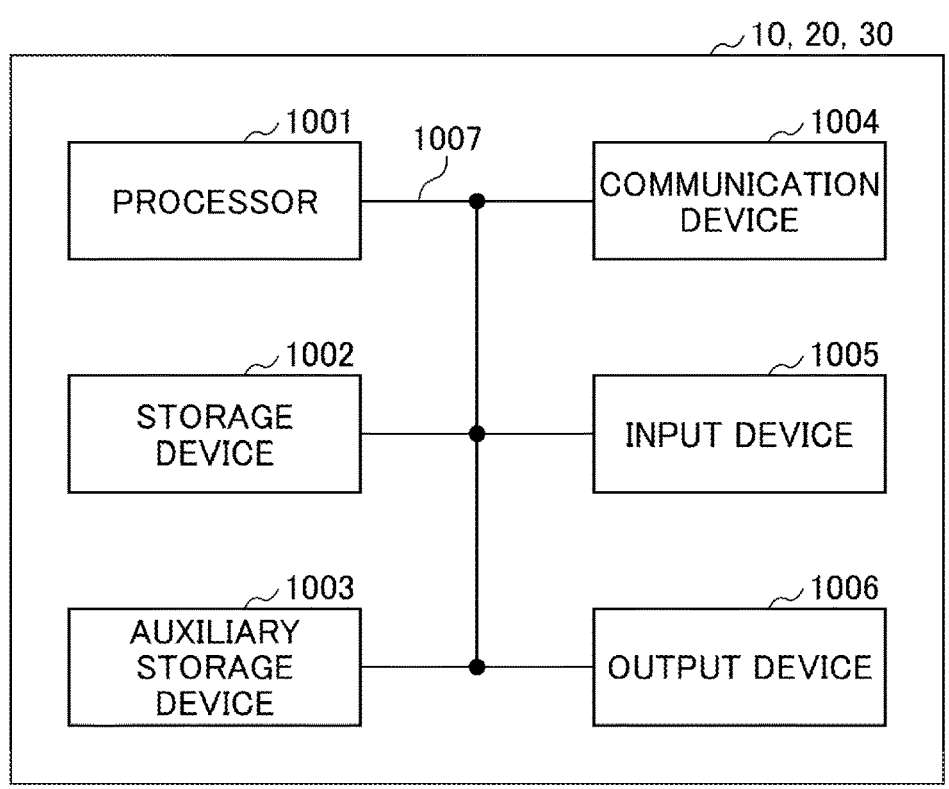
FIG. 9 is a diagram illustrating an example of a hardware configuration of a device according to the embodiment of the present invention.

For example, the base station 10, the terminal 20, the exchange 30 or the like in the embodiment of the present disclosure may function as a computer for processing a wireless communication method of the present disclosure. FIG. 9 is a diagram illustrating an example of a hardware configuration of a device according to the embodiment of the present disclosure. The above-described base station 10 and terminal 20 may be physically configured as a computer device including a processor 1001, a storage device 1002, an auxiliary storage device 1003, a communication device 1004, an input device 1005, an output device 1006, a bus 1007, and the like.

In the following description, the term "device" can be deemed to be replaced with a circuit, device, unit, etc. The hardware configuration of the base station 10 and the terminal 20 may be configured to include one or more of the devices illustrated in the drawing or may be configured without some devices.

Each function in the base station 10 and the terminal 20 is realized by loading predetermined software (program) on hardware such as the processor 1001 or the storage device 1002, to perform the operation by the processor 1001 to control communication by the communication device 1004 or to control at least one of reading and writing data in the storage device 1002 and the auxiliary storage device 1003.

The processor 1001, for example, operates an operating system to control an entirety of the computer. The processor 1001 may be configured by a central processing unit (CPU) including an interface with a peripheral device, a control device, a computing device, a register, and the like. For example, the above-described control unit 140, control unit 240, or the like may be implemented by the processor 1001.

The processor 1001 also reads a program (program code), a software module, data, and the like, from at least one of the auxiliary storage device 1003 and the communication device 1004 into the storage device 1002, and performs various processing in accordance therewith. As a program, a program that causes a computer to execute at least a part of the operations described in the above-described embodiment is used. For example, the control unit 140 of the base station 10 illustrated in FIG. 6 may be implemented by a control program stored in the storage device 1002 and executed by the processor 1001. For example, the control unit 240 of the terminal 20 illustrated in FIG. 7 may be implemented by a control program stored in the storage device 1002 and executed by the processor 1001. For example, the control unit 340 of the exchange 30 illustrated in FIG. 8 may be implemented by a control program stored in the storage device 1002 and executed by the processor 1001. While the various processes described above have been described as being executed by a single processor 1001, they may be executed simultaneously or sequentially by two or more processors 1001. The processor 1001 may be implemented by one or more chips. Note that the program may be transmitted from a network via a telecommunications line.

The storage device 1002 is a computer readable storage medium, and may include at least one of, for example, a ROM (Read Only Memory), an EPROM (Erasable Programmable ROM), an EEPROM (Electrically Erasable Programmable ROM), a RAM (Random Access Memory), and the like. The storage device 1002 may be referred to as a register, a cache, a main memory (main storage device), or the like. The storage device 1002 can store an executable program (program code), a software module, etc. to implement the communication method according to the embodiment of the present disclosure.

The auxiliary storage device 1003 is a computer readable storage medium, and may be configured by, for example, at least one of an optical disc such as a CD-ROM (Compact Disc ROM), a hard disk drive, a flexible disk, a magneto-optical disc (e.g., a compact disc, a digital versatile disc, a Blu-ray (registered trademark) disc), a smart card, a flash memory (e.g., a card, a stick, a key drive), a floppy (registered trademark) disk, and a magnetic stripe. The storage medium described above may be, for example, a database, a server, or other suitable medium including at least one of the storage device 1002 and the auxiliary storage device 1003.

The communication device 1004 is hardware (transceiver device) for communicating between computers via at least one of a wired network and a wireless network, and is also referred to, for example, as a network device, a network controller, a network card, a communication module, and the like. The communication device 1004 may include, for example, a high frequency switch, a duplexer, a filter, a frequency synthesizer, or the like, to achieve at least one of frequency-division duplexing (FDD) and time-division duplexing (TDD). For example, a transceiver antenna, an amplifier, a transceiver, a transmission line interface, or the like, may be implemented by the communication device 1004. The transceiver may be physically or logically separated from a transmission unit and a reception unit.

The input device 1005 is an input device (e.g., a keyboard, a mouse, a microphone, a switch, a button, a sensor, etc.) that receives an external input. The output device 1006 is an output device (e.g., a display, speaker, LED lamp, etc.) that performs output to outside. The input device 1005 and the output device 1006 may be of an integrated configuration (e.g., a touch panel).

Also, each device, such as the processor 1001 and the storage device 1002, is connected via the bus 1007 for communicating information. The bus 1007 may be configured using a single bus or may be configured using different buses between devices.

The base station 10 and the terminal 20 may also include hardware such as a microprocessor, a digital signal processor (DSP), an ASIC (Application Specified Integrated Circuit), a PLD (Programmable Logic Device), and an FPGA (Field Programmable Gate Array), wherein the hardware may implement a part or all of the functional blocks. For example, the processor 1001 may be implemented using at least one of these hardware elements.

In a case in which a core network function such as the serving gateway 31 is configured as a device, the core network function may be configured by the hardware illustrated in FIG. 9, in the same manner as the exchange 30.

Summary of Embodiments

As described above, according to the embodiment of the present invention, there is provision of an exchange that includes a reception unit that receives, from a gateway, a message indicating that there is an incoming call to a terminal, a control unit that adjusts time for transmitting paging corresponding to the message to a base station, and a transmission unit that transmits the paging to the base station at the adjusted time.

According to the above-described configuration, when an incoming call to the terminal 20 arrives, the exchange 30 can transmit the paging to the base station 10 earlier than the determination process pertaining to the WUS in the base station 10 by adjusting paging time earlier as necessary. That is, in the wireless communication system, the probability of receiving paging during discontinuous reception can be increased.

The control unit may adjust the time for transmitting the paging corresponding to the message to the base station, in a case in which the terminal is in a state of discontinuous reception. According to this configuration, when an incoming call to the terminal 20 arrives, the exchange 30 determines whether or not the eDRX is applied to the terminal 20, and adjusts the paging time to advance the paging time if necessary, so that the paging can be transmitted to the base station 10 earlier than the determination process pertaining to WUS that is performed in the base station 10.

The control unit may adjust the time for transmitting the paging corresponding to the message to the base station, in a case in which the terminal is in the state of the discontinuous reception and in which the paging is required to be held. According to this configuration, when an incoming call to the terminal 20 arrives, the exchange 30 determines whether or not it is necessary to hold paging with respect to the terminal 20, and adjusts the paging time to advance the paging time if necessary, so that the paging can be transmitted to the base station 10 prior to the determination process pertaining to WUS that is performed in the base station 10.

The control unit may adjust the time for transmitting the paging corresponding to the message to the base station, in a case in which a function of reducing the paging reception process when performing discontinuous reception, is applied to the terminal. According to this configuration, when an incoming call to the terminal 20 arrives, the exchange 30 can transmit the paging to the base station 10 prior to the determination process pertaining to the WUS that is performed in the base station 10, by adjusting the paging time as necessary.

The control unit may adjust the time for transmitting the paging corresponding to the message to the base station, to a time before transmission of a wake-up signal from the base station to the terminal. According to this configuration, when an incoming call to the terminal 20 arrives, the exchange 30 can transmit the paging to the base station 10 earlier than the determination process pertaining to the WUS that is performed in the base station 10, by adjusting the paging time to advance the paging time as necessary.

The control unit may adjust the time for transmitting the paging corresponding to the message to the base station, to a time before paging presence-or-absence determination based on the wake-up signal transmitted from the base station to the terminal. According to this configuration, when an incoming call to the terminal 20 arrives, the exchange 30 can transmit the paging to the base station 10 earlier than the determination process pertaining to the WUS that is performed in the base station 10, by adjusting the paging time to advance the paging time as necessary.

In addition, according to the embodiment of the present invention, there is provision of a communication method, in which an exchange performs a reception step of receiving a message, from a gateway, indicating that there is an incoming call to a terminal, a control step of adjusting time for transmitting paging corresponding to the message to a base station, and a transmission step of transmitting the paging to the base station at the adjusted time.

According to the above-described configuration, when an incoming call to the terminal 20 arrives, the exchange 30 can transmit the paging to the base station 10 earlier than the determination process pertaining to the WUS in the base station 10 by adjusting paging time earlier as necessary. That is, in the wireless communication system, possibility that paging will be received during discontinuous reception can be increased.

Supplement to Embodiments

While embodiments of the present invention have been described above, the disclosed invention is not limited to such embodiments, and those skilled in the art will understand various variations, modifications, alternatives, substitutions, and the like. Descriptions have been made using specific numerical examples to facilitate understanding of the invention, but, unless otherwise indicated, these values are merely examples and any suitable value may be used. Classification of the items in the above description is not essential to the present invention, and matters described in two or more items may be used in combination as needed, or a matter described in one item may be applied (unless inconsistent) to a matter described in another item. Boundaries of function units or processing units in the functional block diagram do not necessarily correspond to the boundaries of physical parts. Operations of the multiple function units may be performed on physically one part. Alternatively, an operation of one function unit may be performed on physically multiple parts. With respect to the processing procedures described in the embodiment, an order of the procedures may be changed as long as there is no inconsistency. For the convenience of the description of the process, the base station 10 and the terminal 20 have been described using functional block diagrams, but these devices may be implemented in hardware, software, or a combination thereof. Software operated by the processor of the base station 10 in accordance with the embodiments of the present invention and software operated by the processor of the terminal 20 in accordance with the embodiments of the present invention may be stored in a random access memory (RAM), a flash memory (RAM), a read-only memory (ROM), an EPROM, an EEPROM, a register, a hard disk drive (HDD), a removable disk, a CD-ROM, a database, a server, or any other suitable storage medium, respectively.

Indication of information is not necessarily made in accordance with the aspect or the embodiments described in the present disclosure, but may be performed using other methods. For example, indication of information may be performed by a physical layer signaling (e.g., DCI (Downlink Control information), UCI (Uplink Control Information)), a higher layer signaling (e.g., RRC (Radio Resource Control) signaling, MAC (Medium Access Control) signaling, broadcast information (MIB (Master information Block), SIB (System Information Block)), other signals, or combinations thereof. Also, the RRC signaling may also be referred to as an RRC message, and may be a message such as an RRC connection setup message, or an RRC connection reconfiguration message.

Each aspect/embodiment described in the present disclosure may be applied to a system using an appropriate system such as LTE (Long Term Evaluation), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), or applied to a next-generation system enhanced based on the above systems. Multiple systems may also be combined and applied (e.g., combinations of at least one of LTE and LTE-A with 5G, etc.).

The processing procedures, sequences, flow charts, etc. of each aspect/embodiment described herein may be reordered, unless inconsistent. For example, with respect to the methods described in the present disclosure, elements of various steps are presented using an exemplary sequence, and the methods are not limited to the particular order presented.

A particular operation described herein to be performed by the base station 10 may be performed by a upper node in some cases, it is apparent that in a network consisting of one or more network nodes having a base station 10, various operations performed for communication with the terminal 20 may be performed by at least one of the base station 10 and other network nodes (such as, but not limited to, MME or S-GW) other than the base station 10. The above description explains a case in which one network node other than the base station 10 is present, but the network node may be a combination of multiple other network nodes (e.g., MME and S-GW).

The information or signals, etc. described in the present disclosure may be output from a higher layer (or lower layer) to a lower layer (or upper layer). It may be input and output through multiple network nodes.

The input/output information may be stored in a specific location (e.g., memory), or managed using a management table. The input/output information may be overwritten, updated, or appended. The output information may be deleted. The input information, etc. may be transmitted to other devices.

The determination in the present disclosure may be made based on a value (0 or 1) expressed by 1 bit, based on a truth value (Boolean: true or false), or based on numerical comparison (e.g., comparison with a predetermined value).

The software should be broadly interpreted to mean commands, instruction sets, codes, code segments, program codes, programs, sub-programs, software modules, applications, software applications, software packages, routines, subroutines, objects, executable files, threads, procedures, functions, and the like, regardless of whether referred to as software, firmware, middleware, microcode, hardware description languages, or by any other name.

The software, the instructions, the information, and the like may also be transmitted and received via a transmission medium. For example, if the software is transmitted from a web site, a server, or other remote sources using at least one of a wired technology (coaxial cable, optical fiber cable, a twisted pair, a digital subscriber line (DSL), etc.) and a wireless technology (infrared, microwave, etc.), at least one of these wired technology and wireless technology is included in the definition of the transmission medium.

The information, the signals, and the like described in the present disclosure may be represented by using any of various different technologies. For example, data, instructions, commands, information, signals, bits, symbols, chips, and the like, which may be referred to throughout the above description, may be represented by voltage, current, electromagnetic waves, magnetic fields or particles, optical fields or photons, or any combination thereof.

Terms described in the present disclosure and terms necessary for understanding the present disclosure may be replaced by terms having the same or similar meanings. For example, at least one of a channel and a symbol may be a signal (signaling). The signal may also be a message. A component carrier (CC) may also be referred to as a carrier frequency, a cell, a frequency carrier, and the like.

The terms "system" and "network" that are used in the present disclosure are used interchangeably.

Also, the information, the parameters, etc. described in the present disclosure may be represented using absolute values, may be represented using relative values from predetermined values, or may be represented using corresponding other information. For example, a wireless resource may be indicated by an index.

The names used in the above-described parameters are not limited in any respect. Furthermore, mathematical equations using these parameters may differ from those explicitly disclosed in the present disclosure. Because various channels (e.g., PUCCH, PDCCH, etc.) and information elements can be identified by any suitable names, the various names assigned to these various channels and information elements are not limited in any respect.

In the present disclosure, terms such as "base station", "radio base station", "base station device", "fixed station", "NodeB", "eNodeB (eNB)", "gNodeB (gNB)", "access point", "transmission point", "reception point", "transmission/reception point", "cell", "sector", "cell group", "carrier", and "component carrier", may be used interchangeably. The base station may be referred to as a macro-cell, a small cell, a femtocell, a picocell, and the like.

The base station may accommodate one or more (e.g., three) cells. In a case in which the base station accommodates multiple cells, the entire coverage area of the base station may be divided into multiple smaller areas, and in each of the smaller areas, a communication service can be provided by a base station subsystem (e.g., RRH: Remote Radio Head). The term "cell" or "sector" refers to a part or an entirety of a coverage area of at least one of a base station and a base station subsystem providing a communication service in this coverage.

In the present disclosure, terms such as "mobile station (MS)", "user terminal," "user equipment (UE)", and "terminal", may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of a base station and a mobile station may be referred to as a transmitter, a receiver, a communication device, or the like. At least one of the base station and the mobile station may be a device installed in a mobile body, or a mobile body itself, or the like. The mobile body may be a vehicle (such as an automobile or an airplane), an unmanned mobile body (e.g., a drone, an automated vehicle, etc.), or a robot (a manned or unmanned type). It should be noted that at least one of the base station and the mobile station includes a device that is not necessarily mobile during communication operation. For example, at least one of the base station and the mobile station may be an IoT (Internet of Things) device such as a sensor.

In addition, the base station in the present disclosure may be deemed to be replaced with a user terminal. For example, each aspect/embodiment of the present disclosure may be applied to a configuration in which communication between a base station and a user terminal is replaced by communication between multiple terminals 20 (may be referred to as D2D (Device-to-Device), V2X (Vehicle-to-Everything), or the like, for example). In this case, the terminal 20 may be configured to have functions that the aforementioned base station 10 has. In addition, the words "up" and "down" may be deemed to be replaced by the words corresponding to the communication between terminals (for example, "side"). For example, an up ink channel or a downlink channel may be deemed to be replaced with a side channel.

Similarly, the user terminal in the present disclosure may be deemed to be replaced with a base station. In this case, the base station may be configured to have functions that the aforementioned user terminal has.

The terms "determining" and "determining" as used in the present disclosure may encompass a wide variety of operations. For example, judging, calculating, computing, processing, deriving, investigating, looking up, searching, inquiry (e.g., searching a table, database or other data structure), and ascertaining, may be deemed to be "determined". Also, for example, receiving (e.g., receiving information), transmitting (e.g., transmitting information), inputting, outputting, and accessing (e.g., accessing data in memory) may be deemed to be "determined". Further, resolving, selecting, choosing, establishing, comparing, and the like, may be deemed to be "determined". That is, that a certain operation is deemed to be "determined" may be included in a scope of "determining". Also, "determining" may be deemed to be replaced with "assuming", "expecting", "considering", or the like.

The terms "connected", "coupled", or any variation thereof means any direct or indirect connection or coupling between two or more elements, and may include presence of one or more intermediate elements between the two elements "connected" or "coupled" to each other. The coupling or connection between elements may be physical, logical, or a combination of these. For example, "connection" may be deemed to be replaced with "access". As used in the present disclosure, two elements may be considered to be "connected" or "coupled" to each other, using at least one of one or more wires, cables, and printed electrical connections, and, in some non-limiting and non-comprehensive examples, using electromagnetic energy having wavelengths of a radio frequency domain, a microwave domain, and a light domain (both visible and invisible).

The reference signal can also be abbreviated as RS, and may be referred to as a pilot depending on the standard applied.

"Based on" as used in the present disclosure does not mean "based on only" unless otherwise specified. In other words, the phrase "based on" means both "based on only" and "based on at least".

Any references to elements using a designation such as "first" or "second" as used in the present disclosure do not generally limit an amount or an order of those elements. These designations may be used in the present disclosure as a convenient way to distinguish between two or more elements. Accordingly, references to the first and second elements do not imply that only two elements may be adopted or that in some way the first element must precede the second element.

The "means" in the configuration of each of the above-described devices may be replaced by a "unit", a "circuit", a "device", and the like.

It is intended that, if the terms "include", "include" and variations thereof are used in the present disclosure, these terms are as comprehensive as the terms "comprising". Further, it is Intended that the term "or" used in the present disclosure is not an exclusive OR.

In the present disclosure, if an article, such as "a", "an", and "the" in English, is added by translation, the present disclosure may include that nouns following these articles are plural.

In the present disclosure, a sentence "A and B are different" may mean "A and B are different from each other". The sentence may mean that "A and B are each different from C". Terms such as "apart" or "joined" may be interpreted as in "different".

Each of the aspects/embodiments described in the present disclosure may be used alone, in combination, or switched during execution indication of predetermined information (e.g., indication of "X") is not limited to explicit indication, and the indication may be implicitly made (for example, indication may be made by not indicating predetermined information).

Incidentally, in the present disclosure, Downlink Data Notification is an example of a message indicating that there is an incoming call to a terminal. The serving gateway 31 is an example of a gateway. The WUS is an example of the wake-up signal.

Although the present disclosure has been described in detail, it is apparent to those skilled in the art that the disclosure is not limited to the embodiments described herein. The present disclosure may be implemented as modifications and alteration without departing from the spirit and scope of the present disclosure as defined by the claims. Accordingly, the description of the present disclosure is intended for illustrative purposes and does not have any limiting significance to the disclosure.

LIST OF REFERENCE SYMBOLS

10 Base station (eNB)
110 Transmission unit
120 Reception unit
130 Setting unit
140 Control unit
20 Terminal (UE)
210 Transmission unit
220 Reception unit
230 Setting unit
240 Control unit
30 Exchange (MME)
310 Transmission unit
320 Reception unit
330 Setting unit
340 Control unit
31 Serving Gateway (S-GW)
1001 Processor
1002 Storage device
1003 Auxiliary storage device
1004 Communication device
1005 Input device
1006 Output device

The invention claimed is:

1. A network node comprising:
a receiver configured to receive, from a gateway, a message indicating presence of an incoming call to a terminal;
a processor configured to adjust time for transmitting paging corresponding to the message to a base station, wherein the time for transmitting paging is adjusted based on information indicating a transmission time of a wake-up signal received from the base station; and a transmitter configured to transmit the paging to the base station at the adjusted time.

2. The network node according to claim 1, wherein the processor is configured to adjust the time for transmitting the paging corresponding to the message to the base station, in a case in which the terminal is in a state of discontinuous reception.

3. The network node according to claim 2, wherein the processor is configured to adjust the time for transmitting the paging corresponding to the message to the base station, in a case in which the terminal is in the state of the discontinuous reception and in which the paging is required to be held.

4. The network node according to claim 2, wherein the processor is configured to adjust the time for transmitting the paging corresponding to the message to the base station, in a case in which a function of reducing a paging reception process when performing the discontinuous reception, is applied to the terminal.

5. A communication method executed by a network node, the method comprising:

receiving, from a gateway, a message indicating presence of an incoming call to a terminal;

adjusting time for transmitting paging corresponding to the message to a base station, wherein the time for transmitting paging is adjusted based on information indicating a transmission time of a wake-up signal received from the base station; and transmitting the paging to the base station at the adjusted time.

* * * * *